(12) United States Patent
Nilsson

(10) Patent No.: US 7,198,292 B2
(45) Date of Patent: Apr. 3, 2007

(54) AIR-BAG

(75) Inventor: Leif Nilsson, Gotenburg (SE)

(73) Assignee: AutoLiv Development AB, Vargada (SE)

( * ) Notice: Subject to any disclaimer, the term of this patent is extended or adjusted under 35 U.S.C. 154(b) by 378 days.

(21) Appl. No.: 10/831,559

(22) Filed: Apr. 23, 2004

(65) Prior Publication Data

US 2004/0256839 A1 Dec. 23, 2004

(30) Foreign Application Priority Data

Apr. 23, 2003 (GB) ................... 0309215.2

(51) Int. Cl.
*B60R 21/276* (2006.01)
(52) U.S. Cl. .................... 280/739; 280/728.2
(58) Field of Classification Search ................ 280/739, 280/728.2, 732, 742
See application file for complete search history.

(56) References Cited

U.S. PATENT DOCUMENTS

| 5,234,229 | A | | 8/1993 | Gordon |
| 5,509,686 | A | | 4/1996 | Shepherd et al. |
| 5,538,279 | A | | 7/1996 | Link et al. |
| 5,603,526 | A | * | 2/1997 | Buchanan .................... 280/739 |
| 5,853,192 | A | | 12/1998 | Sikorski et al. |
| 6,082,765 | A | * | 7/2000 | Bowers et al. .............. 280/742 |
| 6,213,502 | B1 | | 4/2001 | Ryan et al. |
| 6,382,662 | B1 | | 5/2002 | Igawa |
| 6,406,055 | B1 | * | 6/2002 | Faigle et al. ............. 280/728.2 |
| 6,588,795 | B2 | * | 7/2003 | Fischer et al. .............. 280/736 |

FOREIGN PATENT DOCUMENTS

JP 10-076905 3/1998

* cited by examiner

*Primary Examiner*—David R. Dunn
(74) *Attorney, Agent, or Firm*—Brinks Hofer Gilson & Lione

(57) ABSTRACT

An air-bag is disclosed which incorporates regions of fabric which define a mouth, the mouth being mounted to an air-bag housing such that at least part of the mouth is mounted to the housing by a mount initially positioned to hold an edge part of the fabric defining the mouth adjacent the housing. The mount is capable of movement to move to a position in which the edge of the fabric defining the mouth is spaced from the housing to define a vent between the edge of the mouth and housing.

8 Claims, 5 Drawing Sheets

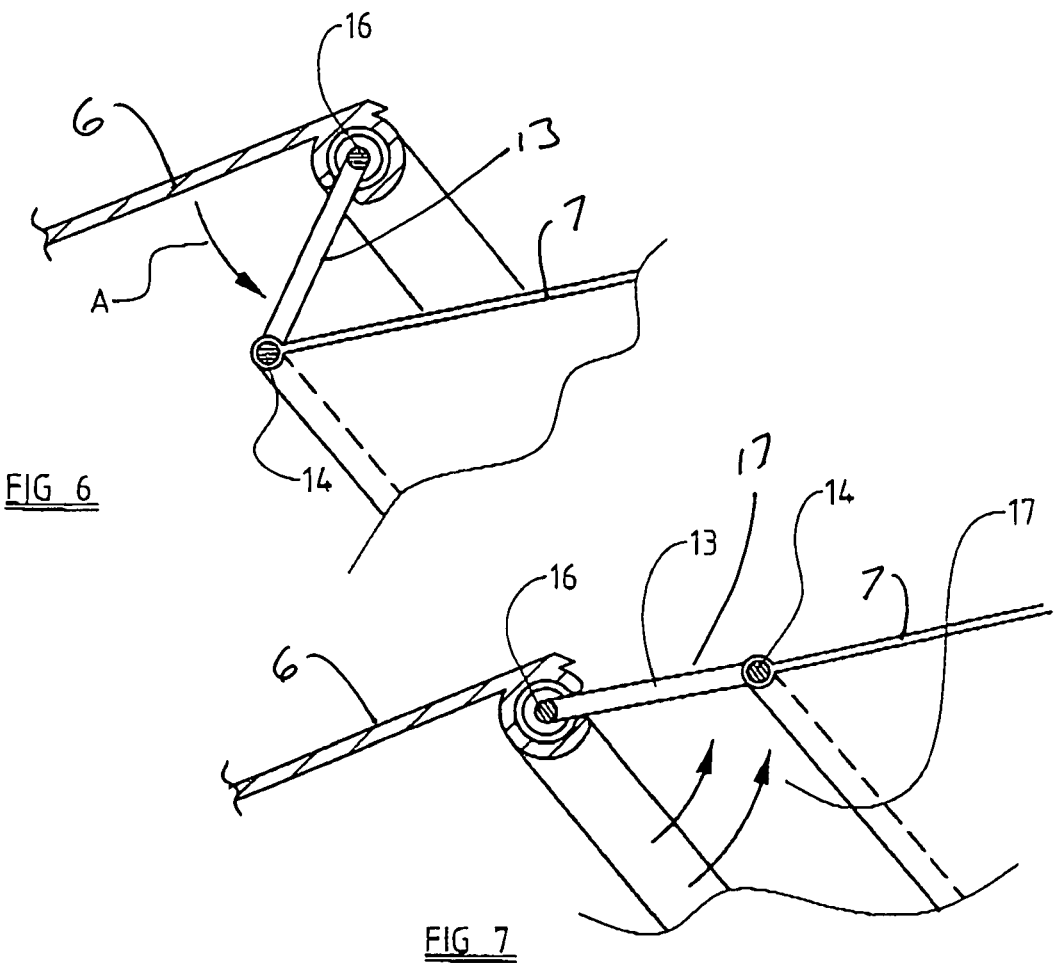
FIG 6
FIG 7
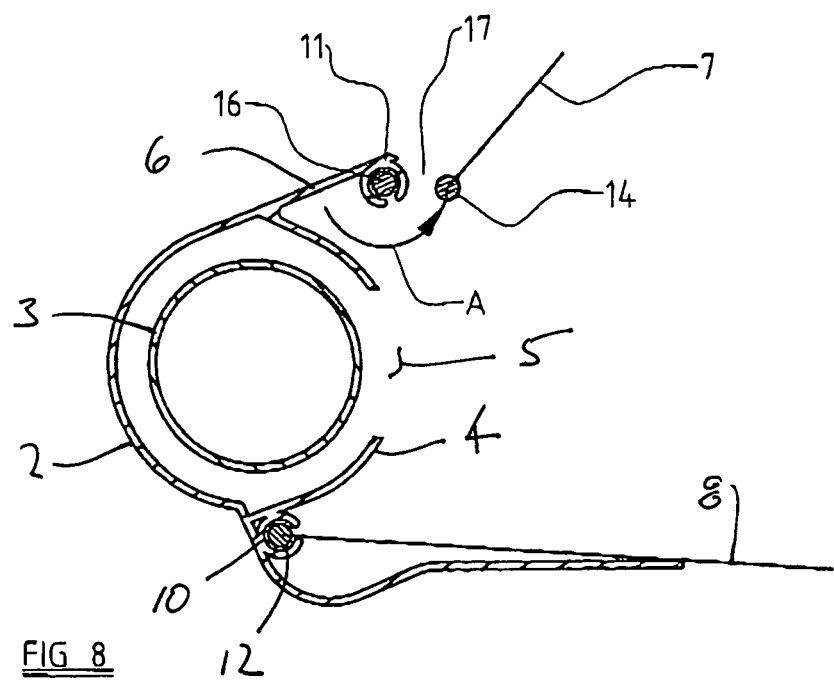
FIG 8

AIR-BAG

CROSS REFERENCE TO RELATED APPLICATION

This application claims priority to GB 0309215.2, filed Apr. 23, 2003 which is currently pending.

BACKGROUND OF THE INVENTION

The present invention relates to an air-bag, and more particularly relates to an air-bag to be mounted on a motor vehicle, the air-bag including a vent.

It is known that it is desirable to provide an air-bag with a vent. The vent may perform one or more various functions. The vent may be a permanently open vent, provided to ensure that an air-bag will deflate slightly when impacted, for example, by an occupant of a vehicle when the vehicle is involved in an accident. This helps prevent the occupant of the vehicle from simply bouncing back away from the air-bag and provides the air-bag with a desirable energy-absorbing characteristic.

Controllable vents may be provided on an air-bag, the vents being opened in response to specific signals or specific situations. A controllable vent may, consequently, open when a pressure in excess of a predetermined threshold is experienced within an air-bag. A vent may also be opened in response to a specific situation such as a seat being occupied by a very heavy occupant, or the occupant of a seat leaning forwardly so as to be located close to the air-bag.

The present invention seeks to provide an improved air-bag which incorporates a vent.

According to the present invention there is provided an air-bag, the air-bag incorporating regions of fabric which define a mouth, the mouth being mounted to an air-bag housing, at least part of the mouth being mounted to the housing by a mount initially positioned to hold an edge part of the fabric defining the mouth adjacent the housing, the mount being capable of movement to move to a position in which the edge of the fabric defining the mouth is spaced from the housing to define a vent between the edge of the mouth and the housing.

Preferably the mount comprises a rigid element, the element having two spaced-apart substantially linear arms, one arm of the element being received within a retainer slot formed in the housing so as to be pivotal about its axis, the other edge of the loop being connected to the edge of the fabric.

Advantageously a release mechanism is provided adapted initially to retain the mount in a first predetermined position, and to release the mount to permit the mount to move.

The release mechanism may be a frangible device which breaks when a predetermined pressure is present within the air-bag.

The release device may also be device which releases the mount in response to a predetermined signal from a sensor.

Advantageously the air-bag takes the form of a passenger air-bag for a front-seat passenger of a motor vehicle.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 6 is a view corresponding to FIG. 4 illustrating part of the air-bag during deployment of the air-bag, FIG. 7 is a view corresponding to FIG. 6 illustrating part of the air-bag at a final stage during deployment of the air-bag, FIG. 8 is a sectional view corresponding to FIG. 5 illustrating the air-bag when deployed.

Whilst the invention is being described specifically with reference to a passenger air-bag intended for use by a front-seat passenger, the invention might find applications in other air-bags for use in other situations.

DETAILED DESCRIPTION OF THE INVENTION

Figure 1:
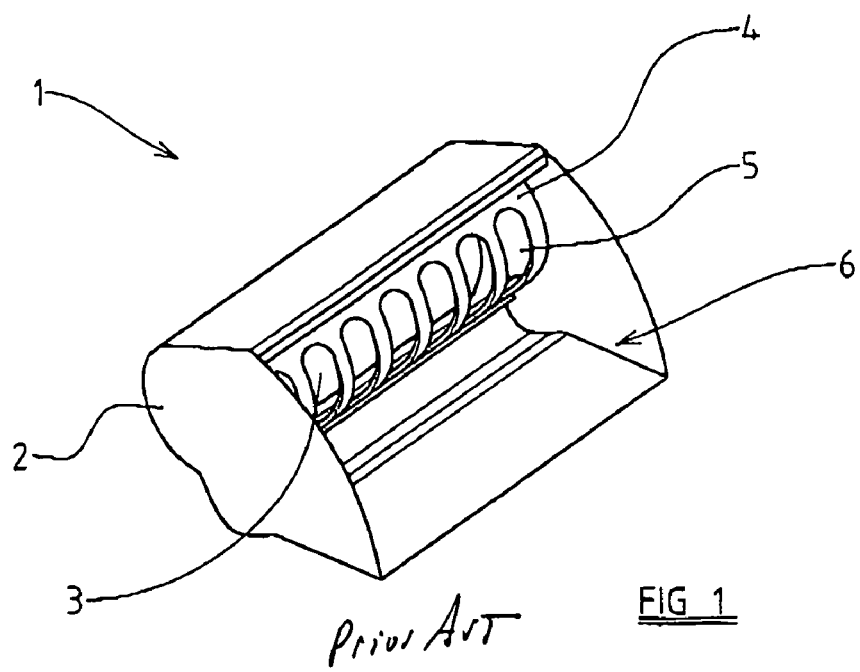
FIG. 1 is a perspective view of a housing for a passenger air-bag.

Referring initially to FIG. 1, a housing 1 is shown which is intended to be mounted within the dashboard of a motor vehicle with the housing containing an air-bag which, when inflated, will be located in front of a front seat passenger in the vehicle. The housing 1 includes a generally cylindrical rear region 2 which contains a cylindrical gas generator 3. The interior workings of the gas generator 3 are not shown in the drawings for the sake of simplicity of illustration. The interior of the housing 1 includes an integral diffuser 4. The diffuser 4 helps define a chamber to contain the gas generator 3. The diffuser 4 is provided with apertures 5 to permit the gas generated by the gas generator 3 to escape from the diffuser 4.

Projecting forward from the generally cylindrical region 2 of the housing 1 is a "scoop"-shaped region 6 which receives a folded air-bag.

Figure 2:
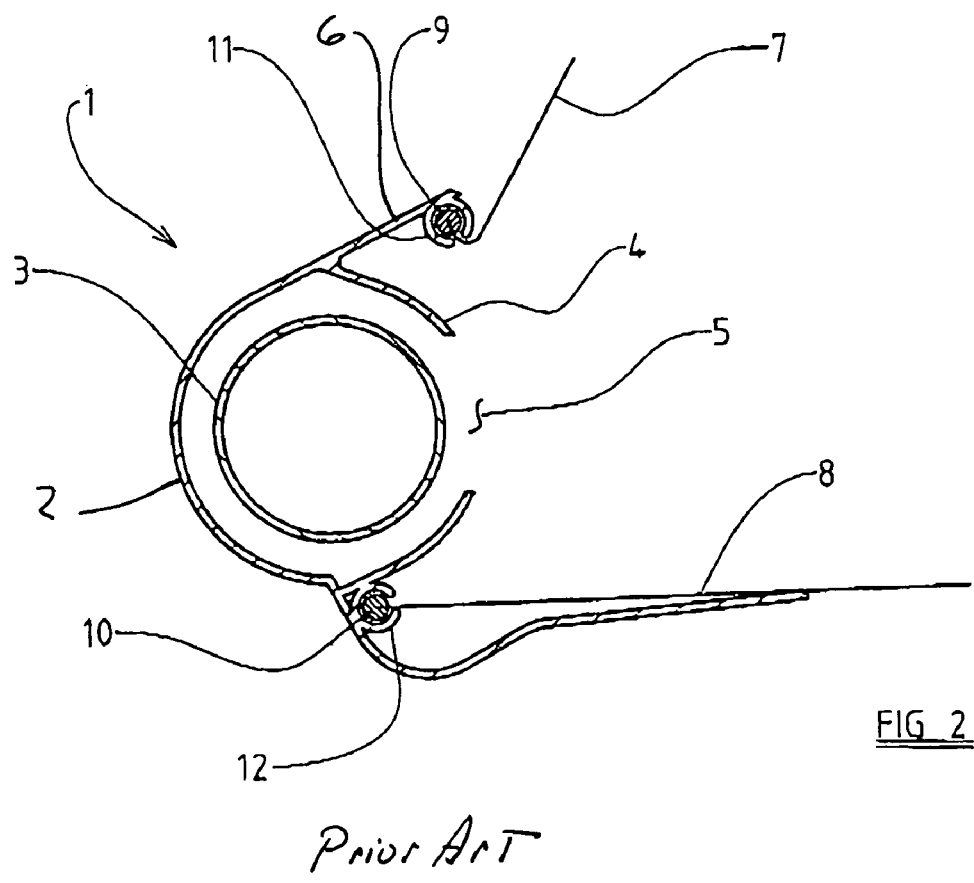
FIG. 2 is a sectional view of the housing of FIG. 1 illustrating part of a conventional air-bag.

As illustrated in FIG. 2, The air-bag is provided with two fabric regions 7, 8, each provided with an edge bead 9, 10. The beads are received within bead-receiving slots 11, 12 formed on the housing 1 close to the cylindrical region 2 thereof. The air-bag may then be folded and stored within the scoop-shaped region 6. The air-bag is spaced from the gas generator 3, thus minimising the risk of the air-bag burning when the gas generator is actuated, and an open mouth of the air-bag, defined between the fabric portions 7 and 8 is adjacent the apertures 5 and the diffuser 4 so that the air-bag may be readily inflated.

The arrangement as discussed above is conventional.

In an air-bag in accordance with the invention, one element of fabric which defines the mouth of the air-bag is mounted to the air-bag housing by a mount which is capable of moving away from the housing to open a vent between the edge of the bag and the housing.

Figure 3:
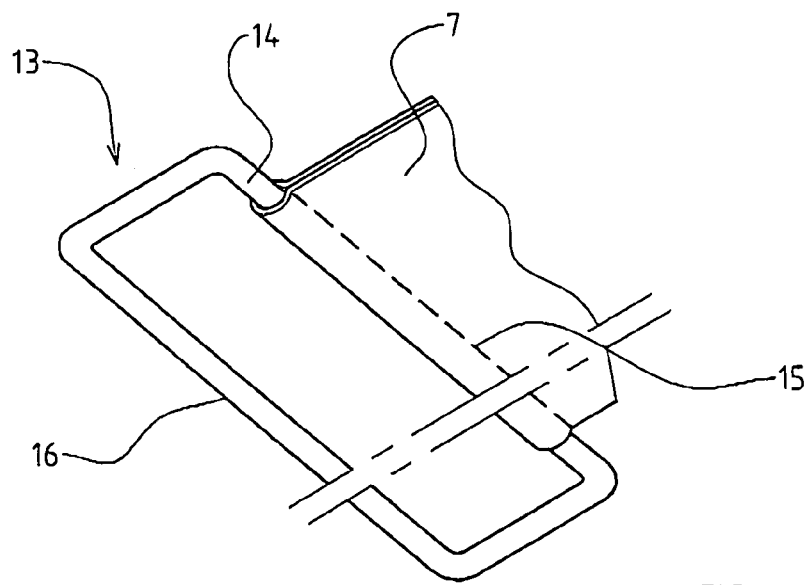
FIG. 3 is a diagrammatic view with parts broken away illustrating part of an air-bag in accordance with the invention.

Turning now to FIG. 3, one edge of the sheet of fabric 7 of an air-bag in accordance with the invention is illustrated. Instead of the edge being provided with a linear bead (such as bead 9), the edge is provided with a mount element in the form of a wire loop 13. The wire loop 13 has a first arm 14 which is received within a stitched pocket 15 defined at the edge of the layer of fabric 7 and has a second arm 16, parallel with the first arm 14, which is spaced from the first arm 14.

Figure 4:
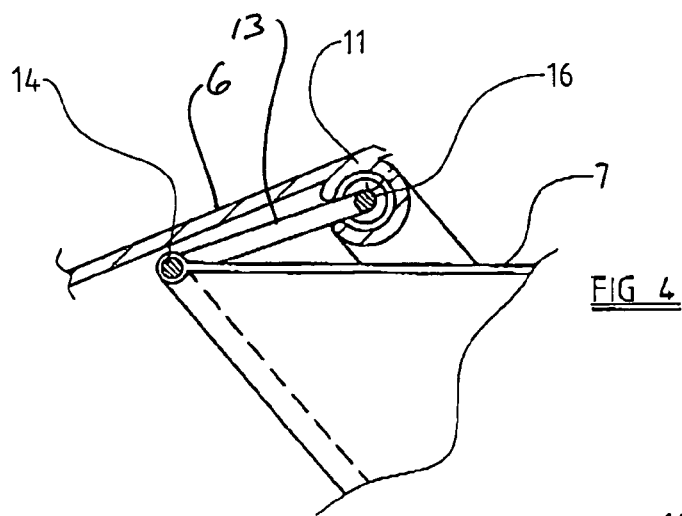
FIG. 4 is an enlarged view of part of the air-bag housing shown in FIG. 1 showing part of an air-bag in accordance with the invention connected to the housing.
Figure 5:
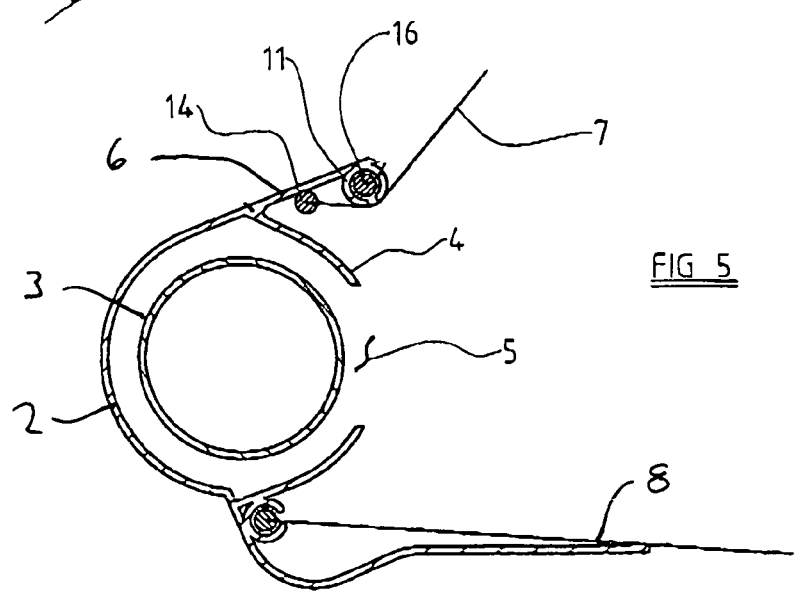
FIG. 5 is a sectional view of the housing of FIG. 1 corresponding to FIG. 2, but illustrating an air-bag in accordance with the invention.

When the air-bag in accordance with the invention is mounted to the housing 1 as shown in FIG. 1, the second arm 16 of the loop 13 is inserted in the bead-receiving slot 11, as shown in FIG. 4, and the loop 13 is caused to lie adjacent part of the housing so that the first arm 14 is located towards the interior of the housing, with the fabric 7 lying across the bead-receiving slot 11. The situation is shown quite clearly in FIG. 5.

It is to be appreciated that the air-bag still presents an open mouth adjacent the apertures 5 of the deflector 4 so that gas from the gas generator will flow through the mouth of the air-bag and inflate the air-bag.

On inflation of the air-bag, when the pressure within the air-bag reaches a predetermined level, the force applied by the fabric 7 to the loop 13 is sufficient to cause the loop 13 to rotate about the axis of the arm 16. This is shown in FIG. 6. The loop is rotating in the direction of the arrow A. The loop continues to rotate until the arm 14 is located on the exterior of the housing, with the result that the loop 13 itself forms an open vent 17 through which gas from the interior of the air-bag may escape.

The situation is shown clearly in FIG. 8.

Figure 9:
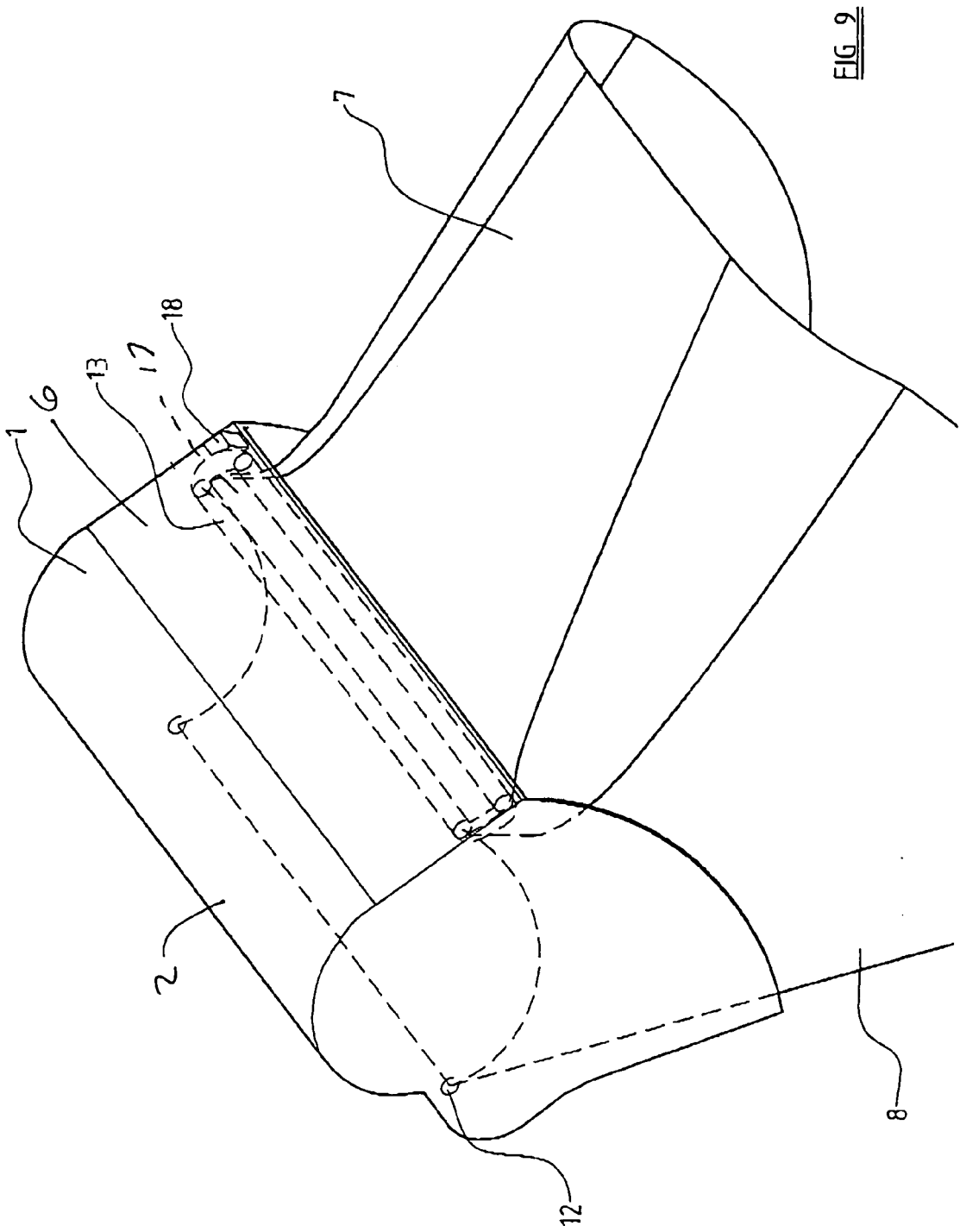
FIG. 9 is a perspective view of a passenger air-bag housing provided with an air-bag in accordance with the invention showing parts of the air-bag in phantom, but with the gas generator and diffuser omitted for the sake of clarity of illustration.

Referring now to FIG. 9, the housing 1 is shown together with the air-bag having the upper and lower fabric layers. The upper layer of FIG. 9 is connected to the housing by means of a loop 13, and the lower layer of fabric is connected to the housing by means of a bead 10 which is equivalent to the bead 10 described in FIG. 2.

A release device 18 is provided which serves initially to retain the loop 13 in its initial position. The release device 18 may be a frangible element adapted to release the loop 13 when sufficient force is applied thereto through the fabric region 7, so that the vent 17 does not open prematurely, or when there is an insufficient level of pressure present within the air-bag. The release device 18 may alternatively release the loop 13 in response to a signal from a sensor, the sensor, for example, being a sensor which senses the weight of a seat occupant, or a sensor which senses the position of the occupant. It is most desirable to have a vent which is open in a passenger air-bag if the passenger is leaning forwards or "out of position" when the air-bag is deployed.

Figure 10:
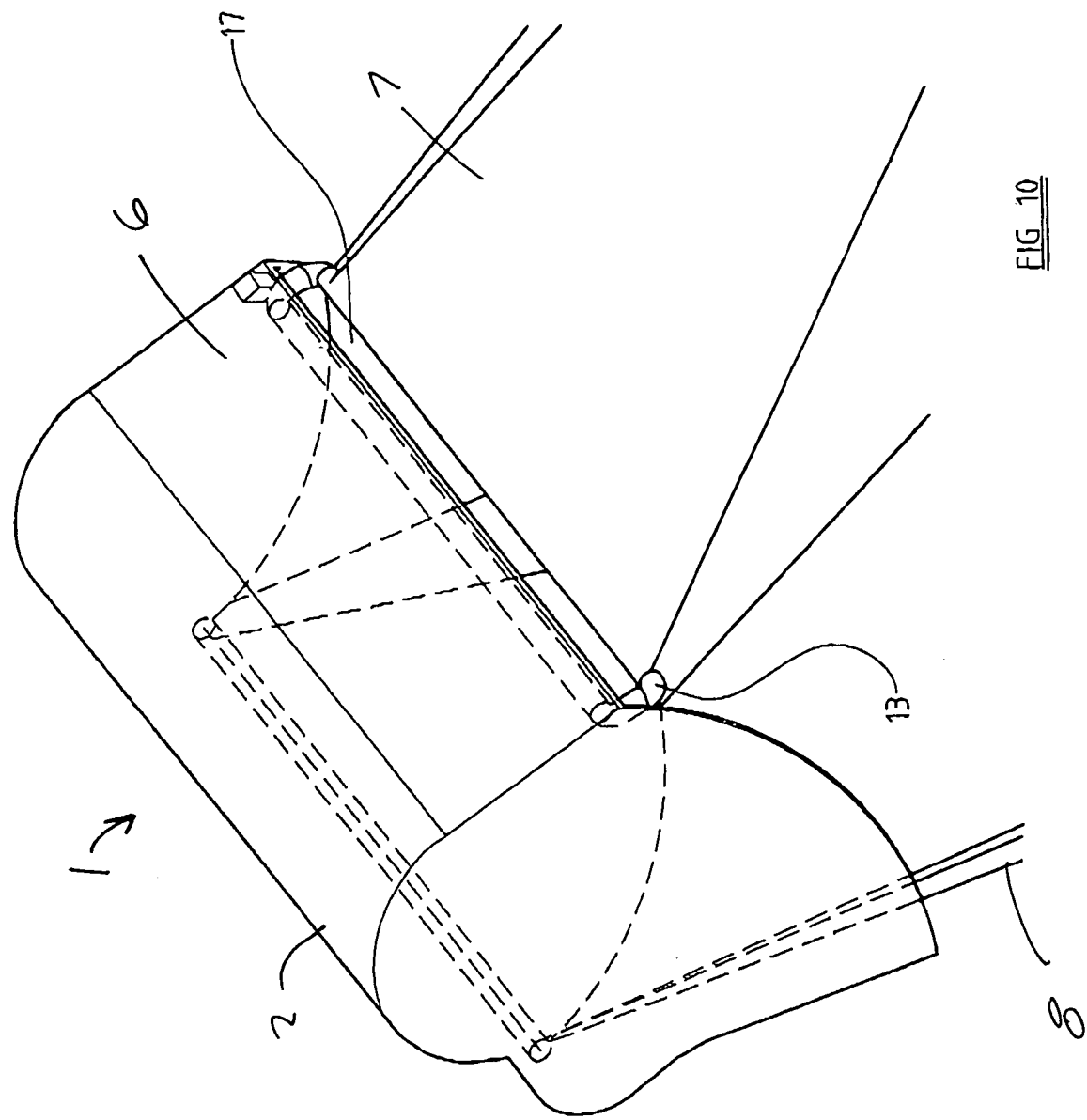
FIG. 10 is a view corresponding to FIG. 9 showing the air-bag during a subsequent stage of its deployment.

FIG. 10 shows the air-bag of FIG. 9 when the release device 18 has released the loop 13 and the loop 13 has moved to the position in which the vent 17 is open.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

I claim:

1. An air-bag comprising regions of a fabric which define a mouth, the mouth being mounted to an air-bag housing at least part of the mouth being mounted to the housing by a mount initially positioned to hold an edge part of the fabric defining the mouth at a first position, the mount being capable of movement to a second position in which the edge part of the fabric defining the mouth is spaced from the housing to define a vent between the edge part of the fabric defining the mouth and the housing, the mount comprises a rigid element, having first and second spaced-apart substantially linear arms, one arm of the element being received within a slot formed in the housing so as to be pivotal about its axis, the other arm of the element being connected to the edge part of the fabric.

2. An air-bag according to claim 1 wherein a release mechanism is provided, the release mechanism being adapted to initially retain the mount in the first position, and to release the mount to permit the mount to move to the second position.

3. An air-bag according to claim 2 wherein the release mechanism is a frangible device which breaks when a predetermined pressure is present within the air-bag.

4. An air-bag according to claim 2 wherein the release mechanism is a device which releases the mount in response to a predetermined control signal.

5. An air-bag according to claim 1 wherein the rigid element comprises a wire loop forming the first and second arms.

6. An air-bag according to claim 5 wherein the vent is formed by an opening between the arms.

7. An air-bag according to claim 1 wherein the first position is adjacent the housing and the second position is spaced from the housing.

8. An air-bag according to claim 1 wherein the pressure, within the air-bag urges the mount to move between the first position and the second position.

* * * * *